D. S. WAUGH.
LUBRICATING MECHANISM.
APPLICATION FILED JUNE 5, 1911.
1,022,284.
Patented Apr. 2, 1912.
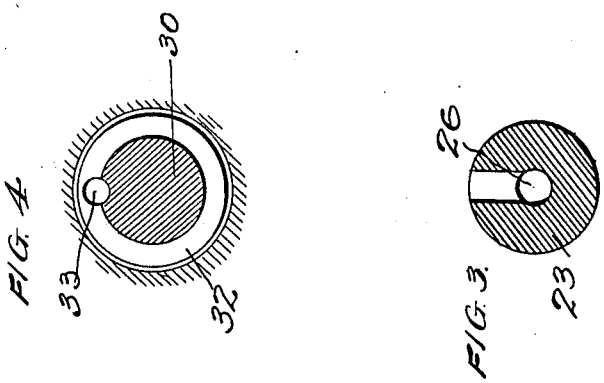
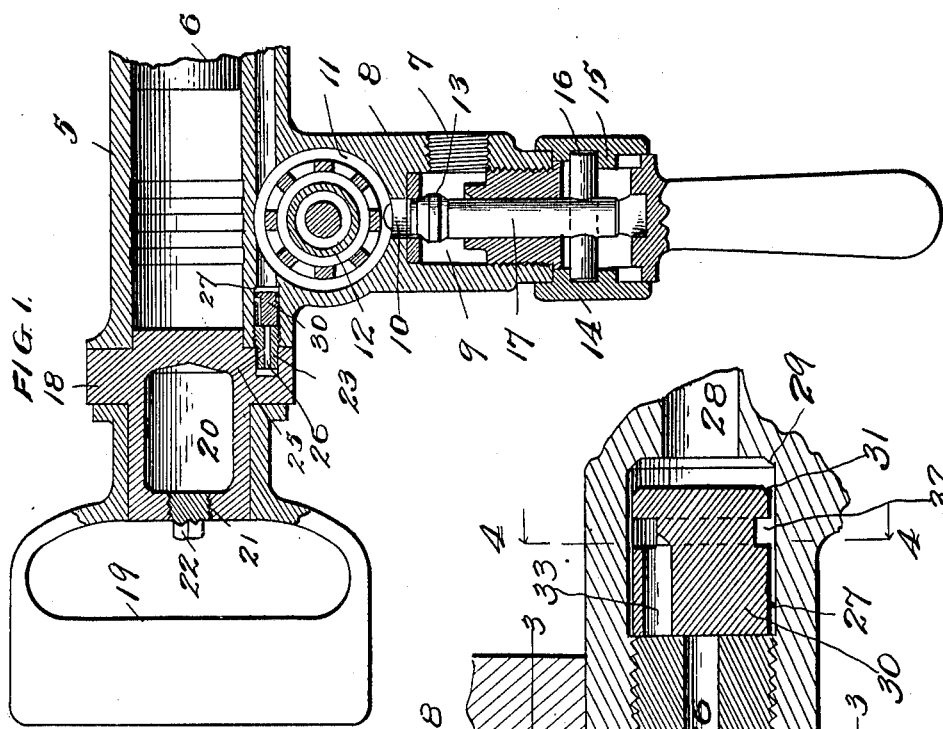
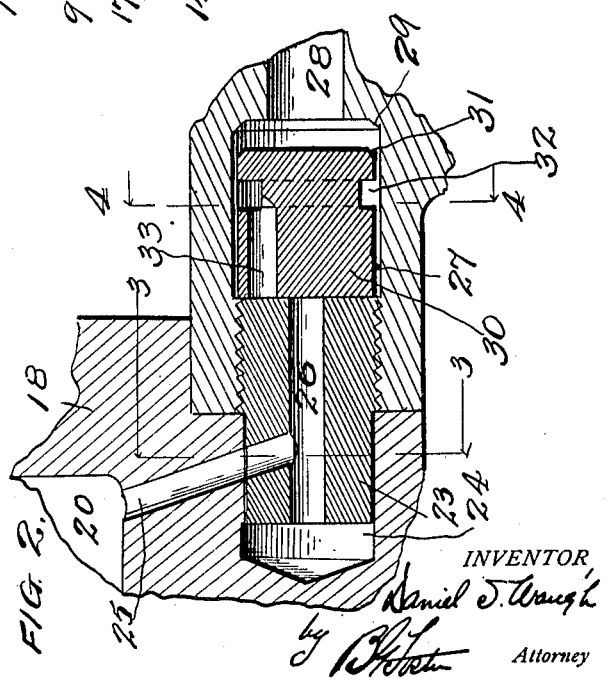
WITNESSES
C. K. Davies
A. C. Welch
INVENTOR
Daniel S. Waugh
by
Attorney

UNITED STATES PATENT OFFICE.

DANIEL SHAW WAUGH, OF DENVER, COLORADO, ASSIGNOR TO THE DENVER ROCK DRILL & MACHINERY CO., OF DENVER, COLORADO, A CORPORATION OF COLORADO.

LUBRICATING MECHANISM.

1,022,284.  Specification of Letters Patent.  Patented Apr. 2, 1912.

Application filed June 5, 1911. Serial No. 631,404.

*To all whom it may concern:*

Be it known that I, DANIEL S. WAUGH, a citizen of the United States, residing at Denver, in the county of Denver and State of Colorado, have invented new and useful Improvements in Lubricating Mechanism, of which the following is a specification.

The present invention relates to means for lubricating motive fluid operated mechanism, particularly that of the pneumatic hammer type, and the object is to provide simple and effective means for delivering a predetermined amount of lubricant to the mechanism, so as to insure the proper lubrication of the same, without having to rely upon the operator's specific attention thereto.

A simple form of construction is illustrated in the accompanying drawings, wherein:—

Figure 1 is a longitudinal sectional view through a portion of a motive fluid operated tool, illustrating the lubricator therefor. Fig. 2 is a similar section on an enlarged scale of the lubricant controlling device. Figs. 3 and 4 are respectively cross sectional views on the lines 3—3 and 4—4 of Fig. 2.

Similar reference numerals designate corresponding parts in all the figures of the drawings.

In the embodiment disclosed, the cylinder of the tool is designated 5, and contains the usual reciprocatory piston, a portion of which is illustrated, and is designated 6. Motive fluid, under pressure, preferably compressed air, is supplied to the cylinder through a coupling connected at 7 to a head 8, the motive fluid entering a chamber 9, and passing therefrom through a port 10 into the casing 11 of an automatic valve 12. From this casing, it is supplied to the cylinder in a manner to cause the reciprocation of the piston 6. The supply of motive fluid is controlled by a valve 13 that reciprocates in the chamber, and is moved to and from a position to close the port 10. This valve is reciprocated by a rotatable nut 14 having internal threads 15 engaging the ends of a cross pin 16 carried by the stem 17 of the valve.

The cylinder 5 is closed by a head 18 rotatably mounted in a handle 19 and containing a lubricant reservoir 20 that is filled through an opening 21 normally closed by a removable plug 22. The head 18 is held against rotation on the cylinder 5 by means of a pin 23 threaded into one end of the cylinder and engaging in a socket 24 formed in the head. A passage 25, leading from the reservoir 20, communicates with a port 26, formed longitudinally in the pin 23, and this port 26 supplies lubricant to one end of a chamber 27 formed in the cylinder wall. The chamber 27 also has an outlet port 28 communicating with one of the air passages of the mechanism, the port 28 being surrounded by a suitable valve seat 29.

A reciprocatory lubricant controlling valve 30 is loosely mounted in the chamber 27, and one end is preferably beveled, as shown at 31, so as to coöperate with the seat 29, and close communication through the port 28. This valve is provided with an annular groove 32, with which communicates a port 33 formed longitudinally in said valve at one side of the center.

Briefly described, the operation of the structure is as follows: The present device is particularly intended for use in drifting drills, though of course not limited to such use. These drifting drills are ordinarily employed with the handle 19 uppermost. Consequently if the valve 13 is closed, it will be evident that the valve 30 will drop to its lowermost position, closing the outlet or delivery port 28. The oil or lubricant can therefore flow through the passage 25 and port 26 into the upper end of the chamber 24, and inasmuch as the upper end of the valve 30 is then spaced from the upper end of the chamber, the lubricant will flow through the port 33 and fill the annular groove 32 with a predetermined quantity of oil. If now the valve 13 is opened, in order to admit motive fluid to the mechanism to cause its operation, the pressure of the same against the lower end of the valve 30 will move said valve to the position illustrated in Fig. 2. As a consequence, the oil can flow freely out of the groove 32, because the said valve 30 is of less diameter than the chamber 27, and this oil entering the port 28 will be distributed by the air to the various portions of the mechanism. When the valve 30 is in the position shown, the supply of lubricant through the port 26 will be cut off, inasmuch as communication between the ports 26 and 33 will be closed. It will thus be seen that automatic mechanism is provided for controlling the supply of lubricant, and that a measured quantity will be delivered each time the motive fluid is cut off and turned on.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. The combination with motive fluid operated mechanism to be lubricated, of means for supplying lubricant thereto, including a chamber having an inlet port opening through one end wall, and an outlet port opening through the opposite end wall, a reciprocatory valve located wholly within the chamber and having a lubricant holding recess, one end of the valve being movable to a position to close the outlet port, the other end being movable against the wall, through which the inlet port opens, said valve furthermore having a channel opening through the latter end and communicating with the lubricant holding recess, the channel being disposed out of alinement with the inlet port.

2. The combination with a cylinder member, of a closure head for one end of the same, containing a lubricant reservoir, a pin for preventing relative rotation between the cylinder and head, having a lubricant passage therethrough, and means for controlling the supply of lubricant through said passage.

3. The combination with a cylinder member, of a closure head for one end of the same, containing a lubricant reservoir, a pin for preventing relative rotation between the cylinder and head, having a lubricant passage therethrough, and automatic means coöperating with the pin and actuated by the motive fluid for controlling the supply of lubricant through the passage.

In testimony whereof I have hereunto set my hand in presence of two subscribing witnesses.

DANIEL SHAW WAUGH.

Witnesses:
W. H. LEONARD,
JAS. R. ELMENDORF.

---

Copies of this patent may be obtained for five cents each, by addressing the "Commissioner of Patents, Washington, D. C."